Jan. 24, 1956

J. F. MATTEO 2,732,169

VALVE ASSEMBLY

Filed Nov. 8, 1950

INVENTOR:
Joseph F. Matteo,
BY Paul & Paul
ATTORNEYS.

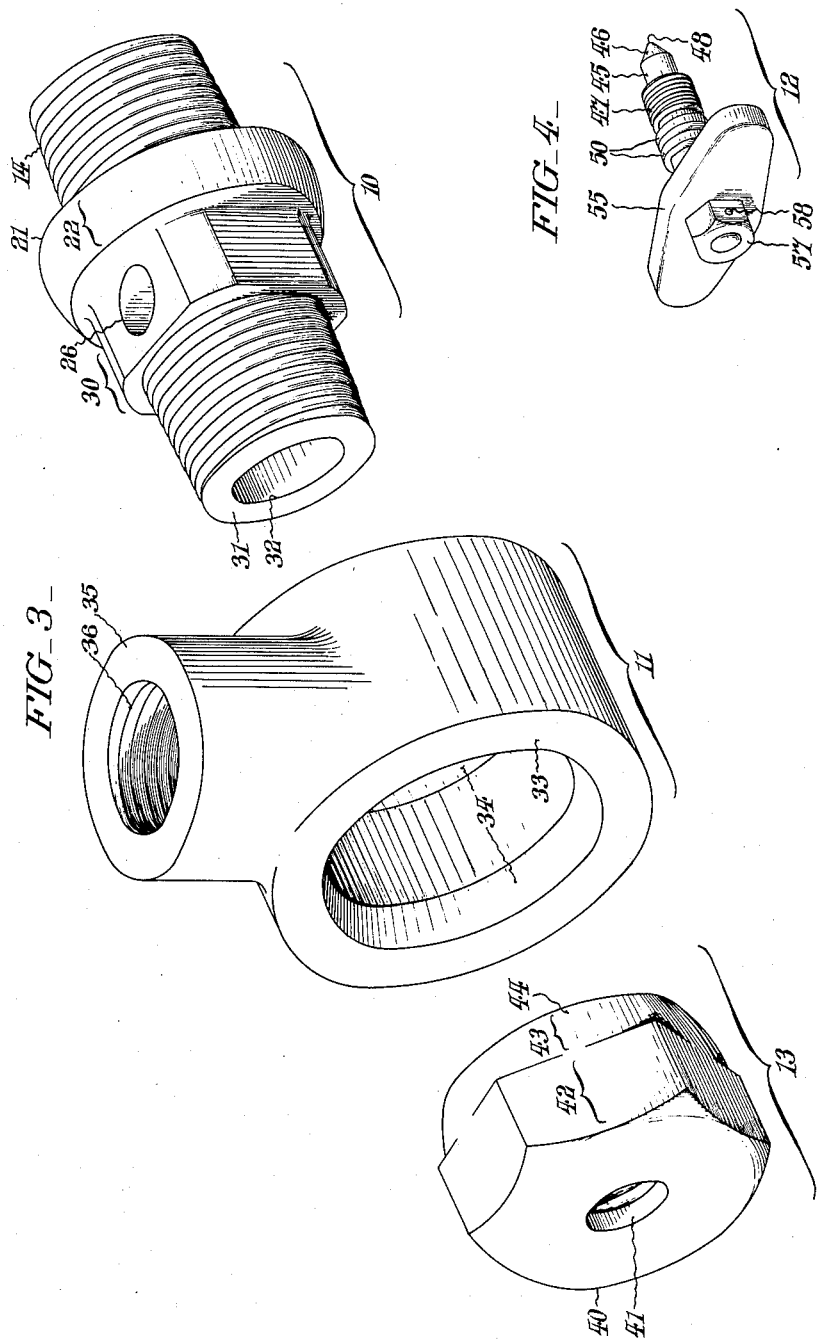

United States Patent Office 2,732,169
Patented Jan. 24, 1956

2,732,169
VALVE ASSEMBLY

Joseph F. Matteo, Clifton Heights, Pa., assignor to The Pennsylvania Railroad Company, Philadelphia, Pa., a corporation of Pennsylvania Application November 8, 1950, Serial No. 194,708

1 Claim. (Cl. 251—148)

This invention relates to a valve assembly, and more particularly concerns a valve for use in connecting together a pair of fluid conduits or containers having connections disposed at angles to one another.

Many attempts have been made to create a valve which is simple to manufacture and yet has the advantages of compactness and adaptability for installation in a restricted place. In diesel powered locomotives, for example, space is at a premium and pipe fittings for fuel oil tanks are often placed in corners or narrow passages near the tanks. Difficulty is encountered in maintaining such piping and fittings, even at maintenance shops provided with special tools and equipment.

The gage glasses serving as liquid level indicators for fuel tanks are frequently mounted in such restricted places and these are particularly difficult to install in view of the fragile nature of the gage glass. Since gage glasses also break from time to time in service, it is important to provide a check valve and supplemental manually operated valve with capacity to shut off as soon as possible the flow of combustible fuel oil from the tank. The provision of such valve elements increases the overall bulk and size of the valve required, with further difficulty in installation, maintenance, and operation.

Moreover, in making connections between a gage glass and metal piping it is important that the glass and pipes be joined together with exertion of minimum force and that they be placed and maintained in accurate alignment. This has been difficult to accomplish, with the use of conventional fittings, particularly in restricted spaces.

It is accordingly an object of the invention to provide a valve assembly adapted for installation in a restricted place. Another object of the invention is to provide a readily adjustable assembly for connecting together conduits or other fluid containers disposed at angles to one another. Still another object is to provide a check valve assembly particularly adapted for connecting a gage glass to a tank containing liquid. Other objects and advantages, including the simplicity and economy of the assembly, as well as its adaptability to a wide variety of uses, will appear in further detail hereinafter.

In summary, the foregoing and other objects of the invention are attained by the assembly comprising a stud piece in the form of a fluid conduit adapted to be connected to one fluid container, a swivel element also in the form of a fluid conduit, said swivel element being constructed and arranged for free universal movement in contact with the stud piece, said swivel element being adapted thereby for adjustment and connection to a second fluid container, fluid connection between the stud piece and the swivel element, and a union piece adapted to engage the stud piece and the swivel element to hold them in position after adjustment.

Of the drawings:

Fig. 3 represents an exploded view in perspective of certain of the individual elements of the valve assembly of Fig. 1; and Fig. 4 represents a view in perspective, reduced in scale, of the valve element of the valve assembly of Fig. 1.

Figure 1:
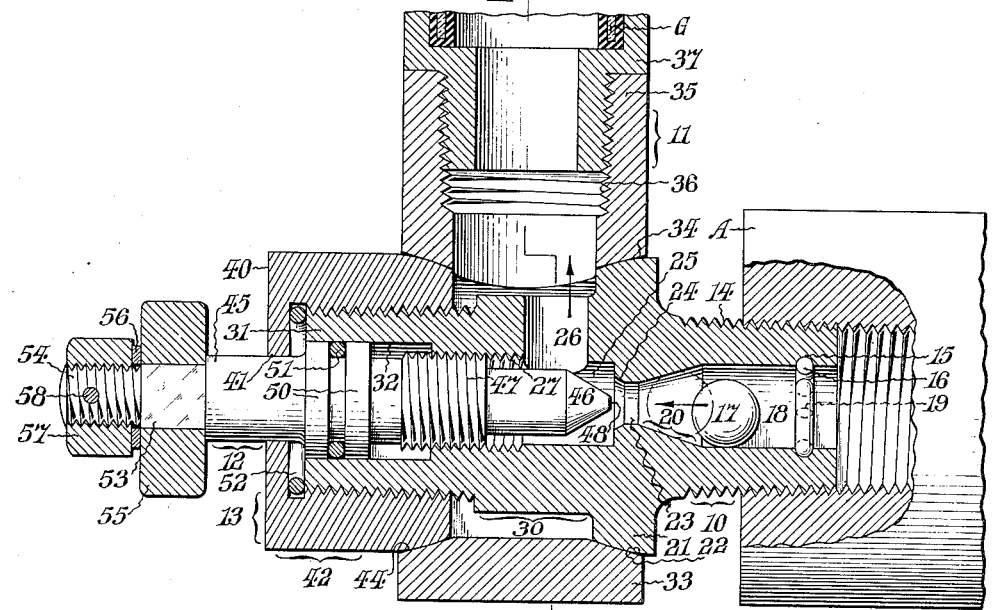
Fig. 1 represents a side sectional view of one specific valve assembly constructed in accordance with the invention, certain of the parts being shown in full elevation.
Figure 2:
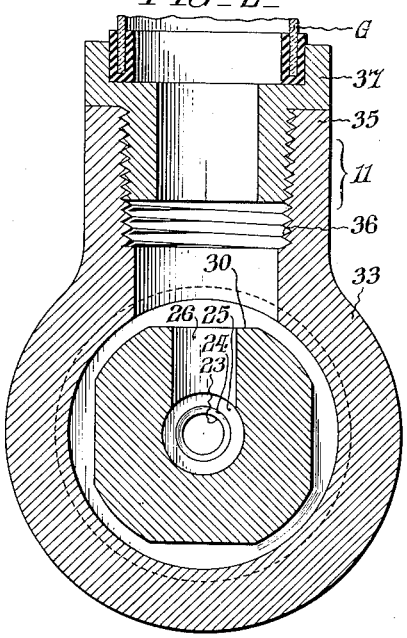
Fig. 2 represents a sectional view taken as indicated by the lines and arrows II—II which appear in Fig. 1, certain elements including the valve stem 45 being removed for the sake of clarity.

Having reference now to the drawings, the specific angle valve selected for illustration consists essentially of a stud piece 10, a swivel element 11 constructed to fit over and around a portion of the stud piece 10, a valve unit 12 which is threadedly engaged with the inner bore of stud piece 10, and a union nut 13. Union nut 13 engages the swivel element 11 and stud piece 10 to hold the entire valve assembly together, and serves as a seal member for the assembly.

Stud piece 10 has a threaded end 14 for connection to a fluid container such as the fuel oil tank A, for example. Adjacent the threaded end 14, within the bore 18 of the stud piece 10, is an annular slot 15 accommodating the retainer ring 16 which is constructed of spring metal for ready insertion and withdrawal. Check ball 17 is also within the bore of the stud piece 10, the bore being bevelled or sloped to form a check seat 20 for the check ball 17. A rod 19 on retainer ring 16 projects across the bore 18, retaining the ball 17 within the bore.

A flange 21 having a curved peripheral surface 22 is formed integrally with the stud piece 10. The curved surface 22, preferably in the form of a section of a sphere, comprises a seat for the swivel element 11, as will appear in further detail hereinafter.

Within the bore of stud piece 10, spaced from check seat 20 by the restricted passage 23, is a sloping surface comprising the valve seat 24. The stud piece 10 has an enlarged bore forming a chamber 25 adjacent the valve seat 24, and disposed substantially centrally in the stud piece 10. Extending at an angle to the principal axis of the stud piece 10 is a connecting passage 26 serving to connect the chamber 25 and the swivel element 11, as will appear hereinafter.

Stud piece 10 has a threaded bore 27 disposed axially in line with the valve seat 24, with chamber 25 disposed therebetween. The threaded bore 27 accommodates the valve element 12, as will appear.

Adjacent the flange 21 the outside surface of the stud element 10 has an enlarged head element 30 with flat surfaces, while the end portion 31 of the stud element 10 is threaded exteriorly. The end portion 31 has a cylindrical bore 32 of greater diameter than threaded bore 27.

The swivel element 11 is a fluid conduit disposed at an angle to the principal axis of stud piece 10, and consists essentially of a pair of interconnected bored cylindrical conductors disposed at angles to one another. The sleeves 33 has a cylindrical bore greater than the outside diameter of part 30 or 31 of stud piece 10, and has a pair of aligned openings bounded by internally bevelled annular seats 34. Opening into the sleeves 33 is a pipe 35 which is formed integrally with the sleeve 33. Pipe 35 is detachably threaded internally at 36 for connection of a fluid container such as a pipe nipple 37 carrying the resiliently mounted fuel oil gage glass G, for example.

The union nut 13 is in the form of a tube or sleeve having an end wall 40 with an aperture 41. The outside surface of union nut 13 is in the form of a hexagonal nut 42 and includes a seat element 43 having a curved peripheral surface 44 substantially the counterpart of the surface 22 of stud piece 10, and of suitable diameter to effect contact with the adjacent bevel edge 34 of swivel element 11. Union nut 13 has internal threads adapted for engagement with the threaded exterior of the stud piece end portion 31.

Valve unit 12 consists essentially of a valve stem 45 having a forward end 46 in the form of a frustum of a cone constructed and arranged to seat within the valve seat 24 of stud piece 10. The forward end 46 has a blunt tip 48. A set of threads 47 engaging the threads 27 is carried by the valve stem 45, providing for advancement and retraction of the valve unit 12 into and out of engagement with the valve seat 24. Valve stem 45 also carries a pair of spaced rings 50 fitting closely within the cylindrical bore 32. Packing ring 51 is disposed between the rings 50 and the inside wall of stud end portion 31. Another packing ring 52 is disposed between the end wall 40 of union nut 13 and the threaded end 31 of stud piece 10.

The valve stem 45 has an integrally formed handle engaging bar 53. The handle engaging bar 53 has a square cross section and a threaded end 54. Handle 55 has a square aperture and is constructed to fit over handle receiving bar 53. Lock washer 56 and nut 57 together with lock pin 58 serve to secure the handle in place on the valve unit 12.

The check seat 20, check ball 17, valve seat 24, and valve end sector 46 are constructed and arranged in such manner that the ball 17 is free to move to the dash-line position represented in Fig. 1 (generally under the influence of fluid flow in the direction indicated by the arrow in Fig. 1) when the valve stem 45 is in retracted position, as shown in Fig. 1. However, advancement of valve stem 45 moves the tip 48 into contact with the ball 17, returning the ball 17 to the solid-line position as represented in Fig. 1. For this purpose the tapered valve end 46 projects beyond the restricted passage 23 to a point within the bore of check seat 20.

From the foregoing the manner of application of the check valve assembly to a pair of fluid containers will be understood. The stud piece 10 is threadedly engaged with the tank A, or other fluid container, and is tightened in position by application of a conventional wrench to the flat-faced head element 30. The swivel element 11 is then fitted over the free end of stud piece 10, the leading bevelled annular seat 34 being positioned adjacent to, or in contact with, the periphery 22 of flange 21. The pipe nipple 37 is threadedly secured to pipe 35 and the resiliently mounted gage glass G (or other fluid container of any character) is inserted into the seat provided by the pipe nipple 37. The entire swivel element 11 may be swung around the axis of stud piece 10 and also rocked to a limited extent longitudinally of said axis when the stud and cap 13 are loosely threaded together. In this manner the gage glass G and pipe nipple 37 are brought into engagement with ease since the flange 21 has a curved peripheral surface 22 against which the bevelled annular seat 34 bears. Moreover the pipe nipple 37 is readily aligned in final position with the gage glass G after these elements are interengaged, by reason of the construction of the curved peripheral surface 22.

The valve unit 12 and union nut element 13 are assembled by projecting the valve stem 45 through the aperture 41, placing the handle 55 over bar 53, and attaching the lockwasher 56, nut 57, and lock pin 58 in position. This assembled unit is then attached to complete the valve assembly by screwing the union nut 13 to the threaded end 31 of stud piece 10, and engaging the set of threads 47 within the threaded bore 27. Union nut 13 may be tightened against swival element 11 by means of a conventional wrench. Sufficient wrench pressure is exerted to form a fluid seal between the bevelled peripheral surfaces 34 and the curved surfaces 22 and 44.

It will be observed that, upon breakage of gage glass G, fluid will tend to flow in the direction of the arrows in Fig. 1, through the restricted passage 23, chamber 25, connecting passage 26, and outwardly through the broken gage glass G. However the check ball 17 seats against the check seat 20 under the influence of the flowing fluid, interrupting the flow promptly. The valve element 46 may then be seated by manual operation against seat 24, returning check ball 17 to its initial position in bore 18.

The valve construction of this invention is particularly advantageous for use in restricted spaced, as will be encountered in fuel oil tanks for diesel powered conveyances such as diesel-electric locomotives, for example. Not only does the compact construction permit installation in spaces too small to accommodate conventional angle valves for fluid openings of equivalent sizes, but the ease with which the valve may be assembled at the place of installation permits its use at relatively inaccessible places where other valves would be difficult if not impossible to install.

Accordingly it will be apparent that certain features of the invention may be used to advantage independently of the use of other features, depending upon the specific application or use for which the valve is intended. Moreover it will be appreciated that while the invention has been described in detail with reference to one specific embodiment adapted for a particular purpose, the invention has many other applications, and that the mechanical elements may be varied considerably with reversals of parts or the substitution of equivalent mechanisms for accomplishing a similar result, all within the scope of the invention as defined in the annexed claim.

Having thus described my invention, I claim:

An angle fitting for a pair of fluid conduits disposed at angles to one another comprising a stud piece in the form of a generally cylindrical piece of pipe having one end threaded for connection to one of said fluid conduits and the other end also threaded, a swivel element in the form of another generally cylindrical piece of pipe having transversely arranged apertures larger than the body of the stud piece whereby said swivel element is slidable on and off said body of said stud piece while its axis is at substantially right angles to the axis of said stud piece, said stud piece having a generally axial passage therein connected to a branch passage, said passages connecting one of said conduits to said swivel element, means forming a valve seat located adjacent the end of said generally axial passage, a union piece having threads engaging said other end of said stud piece for compressing said stud piece and swivel element together, said stud piece and swivel element having meeting seal members in the form of circular ring members one of which has a curved cross section whereby said swivel element is constructed and arranged for limited rocking movement longitudinally of the axis of said stud piece while in contact with said stud piece when said swivel element and said stud piece are not compressed together, said swivel element also having capacity concurrently with said limited longitudinal rocking movement to swing around the axis of said stud piece, said swivel element being thereby adapted for adjustment and connection to the second fluid conduit, said union piece being constructed and arranged to engage the stud piece within said swivel element and to bear against said swivel element to hold it against said stud piece, and a valve stem extending through said union piece and threadedly engaged within said stud piece, said stem including a valve portion coacting with said valve seat to open and close said generally axial passage, said union piece and said swivel element being slidable axially off said valve stem.

References Cited in the file of this patent
UNITED STATES PATENTS

| | | |
|---|---|---|
| 492,619 | Bailey | Feb. 28, 1893 |
| 543,008 | Gale | July 23, 1895 |
| 638,518 | Mansfield | Dec. 5, 1899 |
| 750,539 | Hiller | Jan. 26, 1904 |
| 902,894 | Matthews | Nov. 3, 1908 |
| 1,024,560 | Dale | Apr. 30, 1912 |
| 1,284,496 | Viands | Nov. 12, 1918 |
| 1,678,377 | Brotz | July 24, 1928 |
| 1,762,771 | Eble | June 10, 1930 |
| 1,854,051 | McAndrew | Apr. 12, 1932 |
| 1,893,194 | Blunt | Jan. 3, 1933 |
| 2,377,196 | Walley | May 29, 1945 |

FOREIGN PATENTS

| | | |
|---|---|---|
| 112,003 | Great Britain | 1917 |
| 727,075 | France | 1932 |